United States Patent [19]

Farace et al.

[11] Patent Number: 5,044,201
[45] Date of Patent: Sep. 3, 1991

[54] DOUBLE-INTEGRATING SILICON ACCELERATION SENSING DEVICE

[75] Inventors: Louis P. Farace, Mesa; John D. Titus, Scottsdale, both of Ariz.

[73] Assignee: Motorola, Inc., Schaumburg, Ill.

[21] Appl. No.: 566,789

[22] Filed: Aug. 13, 1990

Related U.S. Application Data

[63] Continuation of Ser. No. 361,524, Jun. 5, 1989, abandoned.

[51] Int. Cl.[5] .................. G01C 21/16; G01P 15/125
[52] U.S. Cl. ..................................... 73/503; 73/516 R
[58] Field of Search ............ 73/490, 503, 515, 516 R, 73/516 LM; 361/280, 283

[56] References Cited

U.S. PATENT DOCUMENTS

| | | | |
|---|---|---|---|
| 3,008,334 | 11/1961 | Lees | 73/503 |
| 3,126,739 | 3/1964 | Whitehill | 73/515 |
| 4,064,763 | 12/1977 | Srinivasan | 73/516 R |
| 4,543,457 | 9/1985 | Petersen et al. | 200/83 N |
| 4,679,434 | 7/1987 | Stewart | 73/514 |

Primary Examiner—John E. Chapman
Attorney, Agent, or Firm—Frank J. Bogacz; Jordan C. Powell

[57] ABSTRACT

A double integrating silicon acceleration sensing device which is solid state and micromachined measures the acceleration of an object and determines the distance travelled by that object through its trajectory. The device comprises a hermetically sealed container. The cavity within the container is divided by a flexible silicon diaphragm into two separate cavities, one shallow and the other deep. The two cavities are filled with a fluid which is relatively incompressible over the range of operating pressure. The fluid can only transfer between the two cavities through an orifice. Two capacitor plates form a capacitor within the shallow cavity. One of the plates is secured to a central portion of the diaphragm, and the other plate is secured adjacent to and opposite of the first plate within the shallow cavity. When the accelerometer is at rest, the two plates are separated by a given distance $X_g$. When the accelerometer experiences an acceleration, the diaphragm deflects into the deep cavity forcing fluid from the deep cavity into the shallow cavity. The gap between the two capacitor plates $X_g$ increases causing a change in the total capacitance. This capacitance value is exactly proportional to the distance travelled by the object for constant acceleration, and is approximately proportional to the distance travelled for other acceleration pulses. When capacitor plates are coupled adjacent and opposite each other in the deep cavity, in addition to capacitor plates in the shallow cavity, a differential capacitance results.

13 Claims, 1 Drawing Sheet

DOUBLE-INTEGRATING SILICON ACCELERATION SENSING DEVICE

This application is a continuation of prior application Ser. No. 361,524, filed June 5, 1989, abandoned.

BACKGROUND OF THE INVENTION

This invention relates, in general, to acceleration sensing devices, and more specifically, to micromachined acceleration sensing devices which determine the distance travelled by an object.

Acceleration sensing devices such as accelerometers are used in a variety of commercial and military applications. The automobile industry, for example, uses accelerometers to activate certain safety devices, such as air bags, during accidents. In military applications, accelerometers aid in measuring the velocity or distance travelled by a missile or projectile during flight. This allows the missile's or projectile's fuze to be armed at the appropriate distance along the missile's or projectile's trajectory. Such accelerometers require sophisticated electronic circuitry to provide a measure of time. The time and the output from the accelerometer are combined in a microcomputer which integrates the output over time to yield velocity or distance travelled.

In the military arena, acceleration driven devices conventionally comprise a mechanical runaway escapement coupled to an eccentric gear. This type of accelerometer is double integrating, or in other words, measures a force caused by acceleration of the accelerometer and estimates the distance travelled by the projectile or missile to which it is attached. The major problem with the mechanical runaway escapement/eccentric gear accelerometers is the low accuracy and high probability of mechanical failure due to the high number of moving parts.

SUMMARY OF THE INVENTION

Accordingly, it is an object of the present invention to provide an acceleration sensing device which can determine the distance travelled by an object from the object's acceleration by mechanical double integration.

Another object of the present invention is to provide an inexpensive double integrating acceleration sensing device which is miniaturized and solid state.

A further object of the present invention is provide an improved flexible silicon diaphragm.

A double integrating silicon acceleration sensing device which is solid state and micromachined measures the acceleration of an object and determines the distance travelled by that object through its trajectory. The device comprises a hermetically sealed container. The cavity within the container is divided by a flexible silicon diaphragm into two separate cavities, one shallow and the other deep. The two cavities are filled with a fluid which is relatively incompressible over the range of operating pressure. The fluid can only transfer between the two cavities through an orifice. Two capacitor plates form a capacitor within the shallow cavity. One of the plates is secured to a central portion of the diaphragm, and the other plate is secured adjacent to and opposite of the first plate within the shallow cavity. When the accelerometer is at rest, the two plates are separated by a given distance $X_g$. When the accelerometer experiences an acceleration, the diaphragm deflects into the deep cavity forcing fluid from the deep cavity into the shallow cavity. The gap between the two capacitor plates $X_g$ increases causing a change in the total capacitance. This capacitance value is exactly proportional to the distance travelled by the object for constant acceleration, and is approximately proportional to the distance travelled for other acceleration pulses. When capacitor plates are coupled adjacent and opposite each other in the deep cavity, in addition to capacitor plates in the shallow cavity, a differential capacitance results.

The above and other objects, features, and advantages of the present invention will be better understood from the following detailed description taken in conjunction with the accompanying drawings.

DETAILED DESCRIPTION OF THE INVENTION

Figure 1:
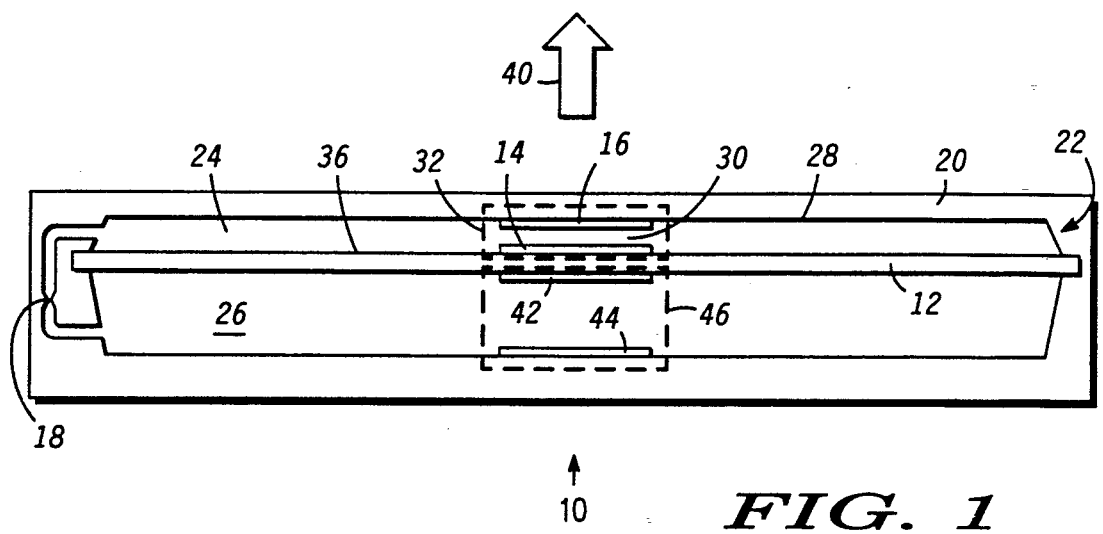
FIG. 1 is a cut-away side view of a double integrating accelerometer according to the present invention.

FIG. 1 shows a cut-away side view of a double integrating silicon acceleration sensing device (ASD) 10. ASD 10, in its preferred embodiment, is micromachined and comprises diaphragm 12, dynamic plate 14, static plate 16, orifice 18, and rigid housing 20.

Rigid housing 20 is a hermetically sealed container which forms a housing cavity 22. Housing cavity 22 is divided by diaphragm 12 into two cavities, shallow cavity 24 and deep cavity 26. Shallow cavity 24 and deep cavity 26 are filled with a fluid that is relatively imcompressible over a given range of operating pressure. By hermetically sealing rigid housing 20, the properties and performance of the fluid are not affected by changes in temperature.

Figure 2:
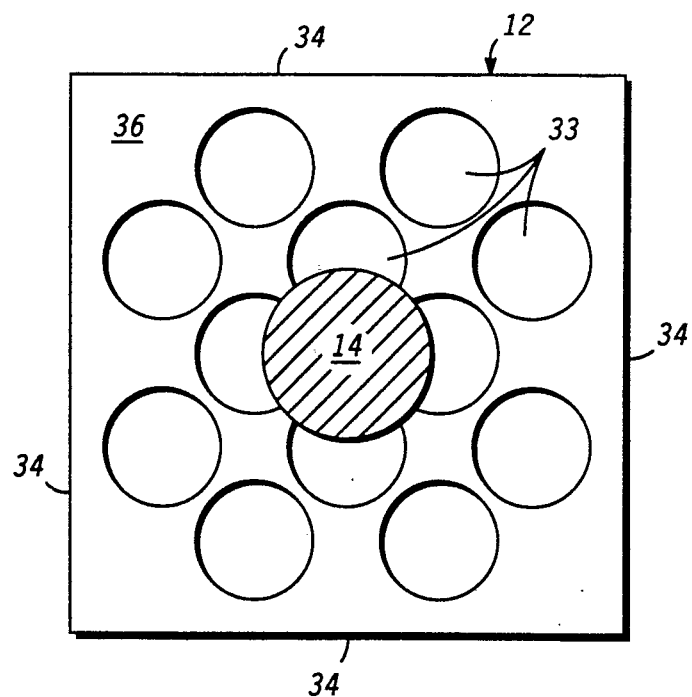
FIG. 2 is top view of a "dimpled" diaphragm according to the present invention.

Dynamic plate 14 is secured to a central portion of a face 36 of diaphragm 12 (also shown in FIG. 2). Face 36 defines one wall of shallow cavity 24. Static plate 16 is secured to face 28 of rigid housing 20 and opposite of and adjacent to dynamic plate 14. Face 28 or rigid housing 20 defines a second wall of shallow cavity 24. The other walls of shallow cavity 24 are further defined by rigid housing 20. Dynamic capacitance plate 14 and static capacitance plate 16 form a capacitor 32 which is electronically coupled to a external control circuit (not shown).

FIG. 2 shows a top view of diaphragm 12 in its preferred embodiment. Diaphragm 12 is a flexible membrane, and is preferably comprised of silicon. Silicon has been used for micromachined diaphragms, see, Micromechanics: The Eyes and Ears of Tomorrow's Computers, *Business Week*, Mar. 17, 1986, pg. 88; Young's Modulus Measurements of Thin Films Using Micromechanics, Kurt E. Peterson and C. R. Guarnieri, *I. App. Phys.* 50(11), November 1979; Silicon as a Mechanical Material, *Proceedings of the IEEE*, Vol. 70, No. 5, May 1982; but still maintains some brittle properties.

Non-micromachined silicon diaphragms have been corrugated to increase the diaphragm's flexibility. See, Design of Corrugated Diaphragms, *ASME Transactions*, Vol. 79, 1957. However, corrugating the diaphragms creates points of high stress in the silicon at each corrugation point. This high stress increases the possibility of failure in the diaphragm.

Figure 3:
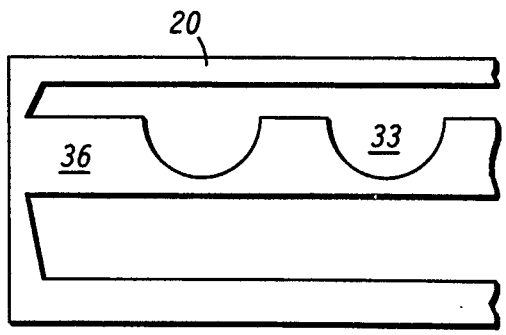
FIG. 3 is a side view of the "dimpled" diaphragm of FIG. 2.

Diaphragm 12 increases the flexibility of the silicon without adding points of high stress by "dimpling", rather than corrugating, face 36. Specifically, diaphragm 12 comprises a number of semi-spherical dimples 33 FIG. 3 shows dimples 33 in a cut-away side view of diaphragm 12 showing the semicircular nature of dimples 33. By placing dimples 33 in a hexagonal close pack arrangement, a maximum number of dimples 33 can be incorporated within diaphragm 12.

Sides 34 of diaphragm 12 in FIG. 2 are secured to, and contained within, rigid housing 20 to completely dissect housing cavity 22.

Orifice 18 is coupled between shallow cavity 24 and deep cavity 26 to allow fluid flow between deep cavity 26 and shallow cavity 24. Because of the restricting shape of orifice 18, fluid flow can be controlled to facilitate double integration of acceleration as discussed below.

Referring again to FIG. 1, when ASD 10 is initially at rest, dynamic plate 14 and static plate 16 form gap 30 having gap Xg. Capacitor 32, at gap Xg, has an initial capacitance $C_1$. When ASD 10 is subjected to any given acceleration in a direction generally along the axis of arrow 40, the mass of diaphragm 12 and dynamic plate 14 cause diaphragm 12 to deflect into deep cavity 26. As diaphragm 12 deflects into deep cavity 26, a pressure differential is created between shallow cavity 24 and deep cavity 26. This differential forces the fluid within deep cavity 26 to flow towards shallow cavity 24. The rate of movement of the fluid is proportional to the hydraulic diameter of orifice 18 and the square root of the pressure differential.

The deflection of diaphragm 12 causes Xg to increase changing the capacitance of capacitor 32. As Xg continues to increase, the capacitance of capacitor 32 continues to change yielding analog outputs. When ASD 10 is used as a switch, ASD 10 activates an external switch when a predetermined threshhold capacitance is reached.

ASD 10 can further comprise capacitor plates in deep cavity 26. As shown in FIG. 1, ASD 10 may comprise plate 42 coupled opposite to dynamic plate 14 on diaphragm 12, and plate 44 coupled to housing 22 opposite plate 42 in deep cavity 26. As with dynamic plate 14 and static plate 16, plates 42 and 44 form a capacitor 46. As diaphragm 12 deflects into deep cavity 26, a change in the capacitance of capacitor 46 may be combined with the change in capacitance of capacitor 32 to produce a differential capacitance.

The distance travelled by an object initially at rest and subject to a acceleration is the double integral of acceleration with respect to time. ASD 10 is a mechanical device which double integrates constant acceleration and pseudo-double integrates non-constant acceleration measured over time to give the distance travelled by an object to which ASD 10 is attached. The following mathematical discussion illustrates the double integrating property of ASD 10 for constant acceleration. Constant acceleration is illustrated due to ease of calculation. However, it should be recognized that distance may be determined by ASD 10 for all applications where acceleration versus time is well behaved and does not contain significant steps.

Diaphragm 12 can be analagized to a damped spring having the mathematical relationship:

$$F = ma + \beta v^2 - kx \qquad (1)$$

where F is the force applied to diaphragm 12, m is the mass of diaphragm 12 and dynamic plate 14, a is the acceleration of diaphragm 12, $\beta$ is the hydraulic diameter of orifice 18, v is the velocity of the fluid flowing through orifice 18 (velocity of the deflection of diaphragm 12 and the fluid flow are equal), k is the spring constant of diaphragm 12, and x is the deflection of diaphragm 12. After a short period, $\beta v^2 >> ma$ and kx. Therefore, the equation becomes:

$$F = \beta v^2. \qquad (2)$$

For an object having a constant acceleration, the relationship between distance and acceleration is given by:

$$x = \tfrac{1}{2} a_m t^2 \qquad (3)$$

where t is time and $a_m$ is the acceleration of the object. The force exerted on diaphragm 12 by the object is:

$$F = m a_m. \qquad (4)$$

Combining equations (2) and (4), and solving for v yields:

$$v = [(c/\beta) m a_m]^{0.5}. \qquad (5)$$

Furthermore, the deflection Xg' of diaphragm 12 can be found by $$Xg' = vt. \qquad (6)$$

Combining equations (3), (5), and (6), and combining terms yields:

$$x = c' Xg' \qquad (7)$$

where c' is a proportionality constant dependent upon the hydraulic diameter of orifice 18. The value Xg represents the distance travelled by the object. Thus it can be seen that the displacement of diaphragm 12 (and therefore the change in capacitance) relative to an object to which ASD 10 is attached is directly related to the displacement of the accelerating object. ASD 10 in this way double integrates acceleration to produce the distance travelled by the object.

Accelerometer 10 may be used to determine the distance travelled by a spinning object having a near constant rotational velocity. The distance travelled by the object along its trajectory is directly related to its rotation. Therefore, the centrifugal force on diaphragm 12 of accelerometer 10 can combine with the double integrating action to produce a turns counting effect.

To illustrate, equation (3) is combined with the centrifugal force field $$F = cm\omega^2 \qquad (8)$$

where $\omega$ is the rotation of the object in radians per second, to yield:

$$v = C\omega. \qquad (9)$$

Since deflection speed of diaphragm 12 is directly proportional to the spin rate of the object, the number of rotations in any time "t" will likewise be proportional to the displacement of diaphragm 12 in the same time "t". Further, since the distance travelled by the object is directly related to the object's rotation, ASD 10 determines distance travelled from rotations of the object.

Thus there has been provided, in accordance with the present invention, a double integrating silicon accelerometer that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An acceleration sensing device comprising:
   device housing including a sealed cavity;
   flexible diaphragm dividing said sealed cavity into a plurality of small cavities;
   said plurality of small cavities filled with a generally incompressible fluid;
   conduit means connecting said plurality of small cavities;
   said conduit means allowing flow of said fluid between said plurality of small cavities:
   a plurality of capacitor plates :
   a first of said plurality of capacitor plates coupled to said flexible diaphragm and a second of said plurality of capacitor plates coupled to said housing and adjacent to said first of said plurality of capacitor plates; and
   orifice means for controlling the rate of flow of said generally incompressible fluid between said plurality of small cavities.

2. An acceleration sensing device according to claim 1 wherein said flexible diaphragm comprises:
   a plurality of semi-spherical cavity means for increasing the flexibility of said diaphragm ; and
   said plurality of semi-spherical cavity means blemishing at least one face of said diaphragm.

3. An acceleration sensing device according to claim 2 wherein said plurality of semi-spherical cavity means are arranged in a hexagonal close pack pattern on said at least one face.

4. An acceleration sensing device according to claim 1 wherein said flexible diaphragm comprises a silicon material.

5. An acceleration sensing device according to claim 1 wherein said acceleration sensing device further comprises:
   a third of said plurality of capacitor plates coupled to said flexible diaphragm; and
   a fourth of said plurality of capacitor plates coupled to said housing adjacent to said third of said plurality of capacitor plates.

6. In a vehicle system, an acceleration sensing device comprising:
   silicon diaphragm;
   first means for increasing the flexibility of said silicon diaphragm, said first means coupled to said silicon diaphragm;
   said first means including:
     a plurality of semi-spherical cavity means for increasing the flexibility of said silicon diaphragm;
     said plurality of semi-sperical cavity means blemishing at least one face of said silicon diaphragm;
   said silicon diaphragm coupled across and dissecting a sealed chamber containing a fluid;
   second means for allowing said fluid to flow between the dissected portions of said sealed chamber at a predetermined rate; and
   said second means connected between the dissected portions of said sealed chamber.

7. An acceleration sensing device according to claim 6 wherein said second means comprises an orifice for controlling the rate of flow of said fluid.

8. In a vehicle system, an acceleration sensing device comprising:
   device housing including a sealed cavity;
   flexible diaphragm dividing said sealed cavity into a plurality of small cavities;
   said plurality of small cavities filled with a generally incompressible fluid;
   a plurality of semi-spherical cavity means for increasing the flexibility of said diaphragm;
   said plurality of semi-spherical cavity means blemishing at least one face of said diaphragm;
   conduit means connecting said plurality of small cavities;
   said conduit allowing flow of said fluid between said plurality of small cavities;
   a plurality of capacitor plates;
   a first of said plurality of capacitor plates coupled to said flexible diaphragm;
   a second of said plurality of capacitor plates coupled to said housing and adjacent to said first of said plurality of capacitor plates; and
   orifice means for controlling the rate of flow of said generally incompressible fluid between said plurality of small cavities.

9. An acceleration sensing device according to claim 8 wherein said plurality of semi-spherical cavity means are arranged in a hexagonal close pack pattern on said at least one face.

10. An acceleration sensing device according to claim 8 wherein said flexible diaphragm comprises a silicon material.

11. An acceleration sensing device according to claim 8 wherein the device further comprises:
    a third of said plurality of capacitor plates coupled to said flexible diaphragm; and
    a fourth of said plurality of capacitor plates coupled to said housing adjacent to said third of said plurality of capacitor plates.

12. In a projectile system, an acceleration sensing device comprising:
    silicon diaphragm;
    a plurality of semi-spherical cavity means for increasing the flexibility of said silicon diaphragm;
    said plurality of semi-spherical cavity means blemishing at least one face of said silicon diaphragm;
    said silicon diaphragm coupled across and dissecting a sealed chamber containing a fluid;
    means for allowing said fluid to flow between the dissected portions of said sealed chamber at a predetermined rate; and
    said means for allowing connected between the dissected portions of said sealed chamber.

13. An acceleration sensing device according to claim 12 wherein said second means comprises an orifice for controlling the rate of flow of said fluid.

* * * * *